Patented Apr. 3, 1951

2,547,505

UNITED STATES PATENT OFFICE 2,547,505

PURIFICATION OF CHLOROPHTHALIC ANHYDRIDES

George W. Steahly, Maplewood, Mo., assignor to Monsanto Chemical Company, St. Louis, Mo., a corporation of Delaware No Drawing. Application August 11, 1949, Serial No. 109,820

18 Claims. (Cl. 260—341)

This invention relates to chlorophthalic anhydrides; more specifically, this invention relates to the purification of a crude chlorophthalic anhydride selected from the group consisting of monochlorophthalic anhydride, dichlorophthalic anhydride, trichlorophthalic anhydride and mixtures thereof.

The above described chlorophthalic anhydrides are generally prepared by the chlorination of phthalic anhydride in the presence of a suitable catalyst, such as ferric chloride, molybdenum chloride, etc. The chlorinated reaction product thus obtained generally contains varying quantites of impurities which impart a dark color to the chlorinated reaction product. The problem of separating chlorophthalic anhydride from such impurities is particularly difficult in commercial operations since the quantity and nature of the impurities vary considerably from batch to batch and from day to day. Crude chlorophthalic anhydrides are generally purified by a distillation without fractionation. When such a method of purification is utilized, it is virtually impossible to prevent, according to the methods heretofore used, the carrying over of some of these impurities into the distillate. Consequently, a simple distillation of crude chlorophthalic anhydride as heretofore practiced does not permit efficient separation of the impurities from the chlorophthalic anhydride, and the resulting distillate, therefore, is generally highly colored as a result of the carrying over of these impurities during the distillation. Furthermore, a simple distillation of crude chlorophthalic anhydride as heretofore practiced results in a distillate having a very strong, penetrating, disagreeable odor.

In the past a similar difficulty was encountered in the purification of phthalic anhydride. It was found, however, that crude phthalic anhydride could be purified by treating the material with various chemical treating agents at a temperature essentially above 270° C. for a period of time to permit separation by distillation of phthalic anhydride from the impurities therein. Typical agents for phthalic anhydride purification were calcium oxide, calcium hydroxide, and sulfuric acid. Contrary to what would be expected, it was found that chlorophthalic anhydrides did not respond to the same type of purification treatment that proved to be acceptable or of utility for phthalic anhydride. In most processes for the purification of phthalic anhydride, it is necessary to treat phthalic anhydride with the chemical treating agent at a temperature in excess of about 270° C. It was found, however, that chlorophthalic anhydride, as above described, could not be subjected to such a chemical treatment at such an elevated temperature, as such temperatures caused the formation of excessive quantities of residues significantly decreasing the yield of purified chlorophthalic anhydride. It was further found that when purification of chlorophthalic anhydride was attempted at lower temperatures, which did not promote the formation of tarry residues, those treating agents which proved most effective for phthalic anhydride were not effective as purification agents for crude chlorophthalic anhydride at these lower temperatures. The purification of crude chlorophthalic anhydride, therefore, presents a unique problem.

One object of this invention is to provide a simple and efficient method of purifying crude chlorophthalic anhydrides selected from the group consisting of monochlorophthalic anhydride, dichlorophthalic anhydride, trichlorophthalic anhydride and the mixtures thereof.

A further object of this invention is to provide an improved method of preparing a purified chlorophthalic anhydride, as above-described, which is characterized by a substantially water white color and a less intense odor.

Further objects will become apparent from the description of the novel process of this invention and the claims.

This invention is practiced in general by subjecting the above-described crude chlorophthalic anhydrides to a chemical treatment at a temperature in the range of from about 180° C. to about 240° C., and then physically separating the chlorophthalic anhydride from the impurities in purified form in a suitable manner. The chemical treatment comprises heating a mixture of said crude chlorophthalic anhydride and a small proportion of an alkaline salt of an alkali metal at a temperature in the range of from about 180° C. to about 240° C. for a period of time sufficient to substantially complete the reaction between such agent and the impurities in the crude chlorophthalic anhydride. Thus, this treatment is of such duration as to materially alter the volatility of the impurities to the extent that chlorophthalic anhydride can be distilled therefrom without a carrying over of the impurities with the chlorophthalic anhydride vapor. Purified chlorophthalic anhydride is then separated from the mixture by distillation, generally under reduced pressure.

The quantity of the alkaline salt of an alkali metal employed, the duration of the treatment and the particular temperature employed in the treatment, are to a certain extent dependent upon each other and to the type of impurities in the crude, and are so correlated with the particular crude under treatment to produce a chlorophthalic anhydride of the desired purity. In general, it is desirable in the treatment of most crudes to employ the alkaline salt of an alkali metal in the amount of about 1-2% by weight of the crude. With some crudes it is possible to employ less of the chemical treating agent, and at times quantities as low as .05% by weight of the alkaline salt of an alkali metal may suffice. On the other hand, other crudes may require larger quantities of the alkaline salt of an alkali metal, at times even as high as 10% by weight. When more of the treating agent is employed than is required to effect purification, the excess is not generally harmful or detrimental, per se, in respect to the chlorophthalic anhydride. However, the residue which is obtained on distillation of the treated chlorophthalic anhydride may be viscous or difficult to distill, and separation of the final portions of the chlorophthalic anhydride may be extremely difficult.

The temperature at which such purification treatment is carried out is in the range of from about 180° C. to about 240° C. While this purification treatment can be carried out advantageously at atmospheric pressure, it is preferably carried out under a suitable reduced pressure which will permit refluxing the chlorophthalic anhydride during this purification treatment at a temperature within the previously prescribed range. The treatment is generally sufficient after heating or refluxing at such temperature for a period of about 6 hours, although a shorter time may suffice in some instances and a longer time of treatment may be required if desired. Preferably, the treatment is carried out at a temperature within the range previously prescribed for a period of time sufficient to substantially complete the reaction between such purifying agent and the impurities in the crude or otherwise act on the impurities so that a purified chlorophthalic anhydride may be separated therefrom.

Any of the alkaline salts of an alkali metal may be utilized in the novel purification process of this invention. Typical of such salts are the sodium, potassium and lithium carbonates, the sodium, potassium and lithium bicarbonates, the sodium, potassium and lithium acetates, the sodium, potassium and lithium propionates, etc. By alkaline salt is meant a salt, the aqueous solution of which has a pH greater than 7.0. Of particular utility because of their obvious economic advantages are the alkali metal carbonates and bicarbonates.

The novel purification process of this invention is applicable to any crude monochlorophthalic anhydride, dichlorophthalic anhydride, trichlorophthalic anhydride, or mixtures thereof. The isomeric structure of the particular crude chlorophthalic anhydride or mixture of crude chlorophthalic anhydrides being purified, has no material effect on the operability of the novel process of this invention. The following list is illustrative of chlorophthalic anhydrides which may be purified according to the novel process of this invention:

3-chlorophthalic anhydride
4-chlorophthalic anhydride
3,4-dichlorophthalic anhydride
4,5-dichlorophthalic anhydride
3,5-dichlorophthalic anhydride
3,6-dichlorophthalic anhydride
3,4,5-trichlorophthalic anhydride
3,4,6-trichlorophthalic anhydride The novel process of this invention will be more clearly understood from the following illustrative examples and the claims.

Example I 500 g. of crude monochlorophthalic anhydride which had been prepared by the chlorination of phthalic anhydride in the presence of a ferric chloride catalyst were charged to a glass still. Under reduced pressure the crude chlorophthalic anhydride was subjected to a simple distillation without fractionation. Approximately 475 g. of distilled monochlorophthalic anhydride were obtained. The monochlorophthalic anhydride thus obtained was dark yellow in color and had a strong penetrating odor.

Example II 10 g. of calcium oxide were added to 490 g. of a crude monochlorophthalic anhydride similar to that utilized in Example I. With constant agitation the mixture was heated at 200° C. at atmospheric pressure for a period of about 6 hours, after which time the monochlorophthalic anhydride was distilled therefrom under reduced pressure. The distilled monochlorophthalic anhydride thus obtained had a color and odor substantially the same as that obtained in Example I.

Example III 10 g. of sodium carbonate and 490 g. of a crude monochlorophthalic anhydride similar to that utilized in Example I were refluxed for about 12 hours at 300° C. Monochlorophthalic anhydride was then distilled therefrom under reduced pressure. While slight improvement in color and odor was noted, the distillation was accompanied by the formation of a considerable amount of a tarry residue which decreased the yield of the distillate by about 15% as compared to that obtained in Examples I and II.

Similar results are obtained when Examples I, II and III are repeated utilizing in place of the monochlorophthalic anhydride, crude dichlorophthalic anhydride and crude trichlorophthalic anhydride.

Example IV 5 g. of sodium carbonate and 495 g. of crude monochlorophthalic anhydride similar to that used in Example I were refluxed under reduced pressure at a temperature of 200° C. for a period of about 6 hours. Monochlorophthalic anhydride was then distilled therefrom under reduced pressure. The monochlorophthalic anhydride which was thus obtained in a 95% yield was water white in color. The intensity of the odor of the distillate was significantly less than that of the distillate obtained in Examples I to III.

Example V 10 g. of sodium bicarbonate and 490 g. of crude monochlorophthalic anhydride similar to that used in Example I were heated at a temperature of 240° C. for a period of about 8 hours at atmospheric pressure. Under reduced pressure monochlorophthalic anhydride was then distilled therefrom. The monochlorophthalic anhydride thus obtained in a 95% yield was essentially water white in color and had a significantly less intense odor than that obtained in Examples I to III.

Example VI

A mixture containing 15 g. of sodium bicarbonate and 485 g. of crude monochlorophthalic anhydride similar to that used in Example I was heated for a period of 8 hours at a temperature of about 185° C. Monochlorophthalic anhydride was then distilled therefrom under reduced pressure and the monochlorophthalic anhydride thus obtained was faintly yellow in color and had a significantly less intense odor than that obtained in Examples I to III.

Example VII

A mixture containing 0.5 g. of potassium carbonate and 499.5 g. of crude monochlorophthalic anhydride similar to that used in Example I was refluxed for a period of 12 hours at a temperature of about 240° C. After this chemical treatment, monochlorophthalic anhydride was distilled therefrom under reduced pressure. The monochlorophthalic anhydride thus obtained was essentially colorless and had a less intense odor than that obtained in Examples I to III.

Example VIII

Treating 495 g. of crude dichlorophthalic anhydride with 5 g. of sodium carbonate in the manner as described in Example IV, results in a purified dichlorophthalic anhydride which is substantially water white in color and possesses a less intense odor than that prepared in Examples I to III.

Example IX

Treating crude dichlorophthalic anhydride with sodium bicarbonate in a manner similar to that described in Example VI, permits the preparation of a purified dichlorophthalic anhydride which is essentially water white in color and characterized by a less intense odor than that obtained in Examples I to III.

Example X

Dichlorophthalic anhydride characterized by being essentially water white and possessing a less intense odor than that prepared in Examples I to III is obtained by treating crude dichlorophthalic anhydride with approximately 2% by weight of sodium acetate according to the method as described in Example IV.

Example XI

Treating crude trichlorophthalic anhydride with sodium carbonate according to the procedure described in Example IV, results in the production of a purified trichlorophthalic anhydride which is characterized by being essentially water white in color and possessing a less intense odor than that obtained in Examples I to III.

Example XII

Essentially water white trichlorophthalic anhydride, also characterized by an odor of less intensity to that prepared in Examples I to III, is obtained by treating crude trichlorophthalic anhydride with 3% by weight of potassium propionate according to the method as described in Example VII.

What is claimed is:

1. A method of purifying crude chlorophthalic anhydrides, which comprises heating a crude chlorophthalic anhydride selected from the group consisting of monochlorophthalic anhydride, dichlorophthalic anhydride, trichlorophthalic anhydride and mixtures thereof, in the presence of an alkaline salt of an alkali metal at a temperature in the range of from about 180° C. to about 240° C. for a period of time sufficient to permit separation of said chlorophthalic anhydride from the impurities therein by distillation, and then separating said chlorophthalic anhydride therefrom in purified form.

2. In a process for the purification of crude chlorophthalic anhydrides, the step comprising heating a crude chlorophthalic anhydride selected from the group consisting of monochlorophthalic anhydride, dichlorophthalic anhydride, trichlorophthalic anhydride and mixtures thereof, in the presence of an alkaline salt of an alkali metal at a temperature in the range of from about 180° C. to about 240° C. for a period of time sufficient to permit separation of the chlorophthalic anhydride from the impurities therein.

3. The process as described in claim 2 wherein the alkaline salt of an alkali metal is an alkali metal carbonate.

4. The process as described in claim 2 wherein the alkaline salt of an alkali metal is an alkali metal bicarbonate.

5. In a process for the purification of crude chlorophthalic anhydrides, the step comprising refluxing under reduced pressure a crude chlorophthalic anhydride selected from the group consisting of monochlorophthalic anhydride, dichlorophthalic anhydride, trichlorophthalic anhydride and mixtures thereof, in the presence of an alkaline salt of an alkali metal at a temperature in the range of from about 180° C. to about 240° C. for a period of time sufficient to permit separation of the chlorophthalic anhydride from the impurities therein.

6. The process as described in claim 5 wherein the alkaline salt of an alkali metal is an alkali metal carbonate.

7. The process as described in claim 5 wherein the alkaline salt of an alkali metal is an alkali metal bicarbonate.

8. In a process for the purification of crude monochlorophthalic anhydride, the step comprising heating crude monochlorophthalic anhydride in the presence of an alkaline salt of an alkali metal at a temperature in the range of from about 180° C. to about 240° C. for a period of time sufficient to permit separation of the chlorophthalic anhydride from the impurities therein.

9. The process as described in claim 8 wherein the alkaline salt of an alkali metal is an alkali metal carbonate.

10. The process as described in claim 8 wherein the alkaline salt of an alkali metal is sodium carbonate.

11. The process as described in claim 8 wherein the alkaline salt of an alkali metal is potassium carbonate.

12. The process as described in claim 8 wherein the alkaline salt of an alkali metal is an alkali metal bicarbonate.

13. In a process for the purification of crude monochlorophthalic anhydride, the step comprising refluxing under reduced pressure crude monochlorophthalic anhydride in the presence of an alkaline salt of an alkali metal at a temperature in the range of from about 180° C. to about 240° C. for a period of time sufficient to permit separation of the monochlorophthalic anhydride from the impurities therein.

14. The process as described in claim 13 wherein the alkaline salt of an alkali metal is an alkali metal carbonate.

15. The process as described in claim 13 wherein the alkaline salt of an alkali metal is sodium carbonate.

16. The process as described in claim 13 wherein the alkaline salt of an alkali metal is potassium carbonate.

17. The process as described in claim 13 wherein the alkaline salt of an alkali metal is an alkali metal bicarbonate.

18. The process as described in claim 13 wherein the alkaline salt of an alkali metal is sodium bicarbonate.

GEORGE W. STEAHLY.

REFERENCES CITED

The following references are of record in the file of this patent:

UNITED STATES PATENTS

| Number | Name | Date |
|---|---|---|
| 1,728,225 | Bowers | Sept. 17, 1929 |
| 1,817,304 | Foster | Aug. 4, 1931 |
| 2,356,449 | Engel | Aug. 22, 1944 |